US006988607B2

(12) United States Patent
Blondiau et al.

(10) Patent No.: US 6,988,607 B2
(45) Date of Patent: Jan. 24, 2006

(54) EQUIPMENT FOR MONITORING THE SPACE IN FRONT OF ESCALATORS AND MOVING WALKWAYS BY HIGH-FREQUENCY SENSORS

(75) Inventors: Dirk Blondiau, Vienna (AT); Gerhard Stoiber, Gosting (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 11/001,400

(22) Filed: Dec. 1, 2004

(65) Prior Publication Data

US 2005/0121288 A1 Jun. 9, 2005

(30) Foreign Application Priority Data

Dec. 8, 2003 (EP) ................................ 03405878

(51) Int. Cl.
*B65G 15/00* (2006.01)

(52) U.S. Cl. ....................................... 198/322; 198/324

(58) Field of Classification Search ................ 198/321, 198/322, 324
See application file for complete search history.

(56) References Cited

U.S. PATENT DOCUMENTS 1,985,563 A 12/1934 Fitzgerald
5,923,005 A 7/1999 Blondiau et al.
6,334,522 B2 * 1/2002 Haruta et al. ............... 198/322

FOREIGN PATENT DOCUMENTS

DE 203 07 951 U1 9/2003
EP 0621 225 A1 10/1994
JP 4-116088 * 4/1992 ................. 198/324

OTHER PUBLICATIONS

Patent Abstracts of Japan, No. 06087592, Mar. 29, 1994, “Automatic Operating Device For Escalator” Toshiba Corp.

* cited by examiner

*Primary Examiner*—James R. Bidwell
(74) *Attorney, Agent, or Firm*—Schweitzer Cornman Gross & Bondell LLP

(57) ABSTRACT

Sensing equipment for monitoring the space in front of escalators for the control of the drive has sensors arranged in handrail inlet caps of the escalator balustrades. Each sensor consists of a transmitter and a receiver and operates with high-frequency waves. The sensors monitor the access to the escalator in a specific region in front of the entry to the escalator, for example the region of the entrance plate. On entry into the monitoring region of a sensor the high-frequency waves emitted by the transmitter are reflected by the person or object and picked up by the associated receiver and the escalator drive is switched on.

13 Claims, 2 Drawing Sheets

EQUIPMENT FOR MONITORING THE SPACE IN FRONT OF ESCALATORS AND MOVING WALKWAYS BY HIGH-FREQUENCY SENSORS

The invention relates to equipment for monitoring the space in front of escalators and moving walkways for control of the drive.

BACKGROUND OF THE INVENTION

In the case of known controls for escalators the drive is switched off when the escalator is unused. If passengers approach the escalator, a signal is triggered, for example by crossing a light barrier, and the drive is switched on. After expiry of a predetermined period of time, at the earliest after the last passenger has left the escalator, the drive is again switched off.

A control system for drives of escalators has become known from, for example, U.S. Pat. No. 1,985,563, in which columns with a light barrier are arranged at the entrance to the escalator. If a passenger goes through the light beam then the escalator, which is stationary in the unused state, is switched on.

In the case of the afore-described solution the light barrier is arranged at a spacing from the escalator on separate columns. This requires an additional and unnecessary cost for materials and installation. Moreover, a passenger does not necessarily pass through the light barrier. A person who does not know the control system and approaches the stationary escalator from the side can, by going around the light barrier, walk onto the escalator without it being switched on. This can invoke the disadvantageous impression of a defective or unreliable escalator.

In addition, indicating and information equipment for an escalator has become known from EP 0 621 225, which equipment is installed in the balustrade. The panel-like equipment is detachably connected with the balustrade. This equipment contains several components, such as light barriers, indicating elements, etc. Avoidance of the barrier by a mode of operation as described above is not possible. If a passenger walks onto the stationary escalator and interrupts the light barrier at the height of the handrail deflection the drive would thereby be switched on. In this case, however, there is created an unpleasant, possibly even risky—and thereby unreasonable to the passenger—state, since the approaching passenger already stands on the steps of the escalator when it is switched on. Moreover, in this solution as well an additional panel is necessary in order to accommodate components, such as the light barrier. This panel additionally diminishes the visual impression of the balustrade, which possibly consists of glass, and offers virtually no protection against vandalism.

Patent EP 0 847 956 shows light sensors which are arranged in the region of handrail deflection, with transmitters and receivers which monitor the entire space in front of the escalator. This device is unobtrusive, but still visible, and for that reason not completely vandal-proof. Moreover, the light sensors are misdirected by weather influences and triggered in the case of, for example, direct receipt of sunlight. Such sensors also require large and expensive amplifiers and an electronic evaluating system and cannot recognize the direction of a movement. Persons who, for example, go onto the escalator and those who leave the escalator are treated in the same manner. When escalators are arranged in parallel, it often happens that persons departing one escalator erroneously cause starting up of another escalator.

BRIEF DESCRIPTION OF THE INVENTION

The present invention has the object of monitoring—for control of a drive—of the space in front of escalators and moving walkways of the kind stated in the introduction which does not have the aforesaid disadvantages and enables, in a simple mode and manner, early recognition of passengers, is not misdirected by weather influences, is completely invisible and is cheaper and more compact, and recognizes the direction of a movement.

In accordance with the object, sensors are arranged in the region of handrail deflection. The sensors monitor the entry region of the escalator and are sensitive to electromagnetic waves with a wavelength longer than 100 micrometers. This wavelength range lies outside the visible light range and infrared range of the electromagnetic spectrum.

The advantages achieved by the invention are essentially to be seen in that the sensors cannot be misdirected by weather influences, such as, for example, sunlight, mist, artificial lighting and heat radiation.

Further advantages achieved by the invention are that the sensors can be arranged to be covered or dissimulated so as to be invisible to users, since, for example, they can be covered by a plastics material cap. Such a cap can stop optical electromagnetic waves, but not electromagnetic waves with a wavelength longer than 100 micrometers. The entire escalator is thereby more vandal-proof.

Moreover, the escalator control circuitry, typically in the form of a printed circuit board, can be smaller and thereby less expensive, since no electronic evaluating system and no amplifier are needed for the new monitoring equipment in this wavelength range.

Directional recognition is also made possible, in monitoring equipment according to the invention, through Doppler effect evaluation. It offers the advantage of recognizing only persons who go onto the escalator and not those who leave the escalator, or who only brush or cross over the wave cone. This is a significant advantage when escalators are arranged in parallel, as departing passengers often erroneously cause the other escalator to start up when conventional sensors are used.

Advantageously, sensors are mounted on both sides of the escalator so that the wave cone is symmetrical relative to the escalator and recognition of persons is undertaken more precisely and accurately. The sensors may be advantageously constructed as high-frequency sensors, i.e. sensitive to electromagnetic wavelengths shorter than 1 meter. In this wavelength range the accuracy of recognition of persons is maximized.

By virtue of an unobtrusive arrangement of the sensors, damage by vandalism as well as unintentional damage is to the larger extent avoided. The visual impression of the escalator remains unchanged. Moreover, additional components are no longer necessary at the balustrade or in the frontal area.

BRIEF DESCRIPTION OF THE DRAWINGS

Illustrative embodiments of the invention are shown in the drawings and explained in more detail in the following description, wherein.

DETAILED DESCRIPTION OF THE INVENTION

Figure 1:
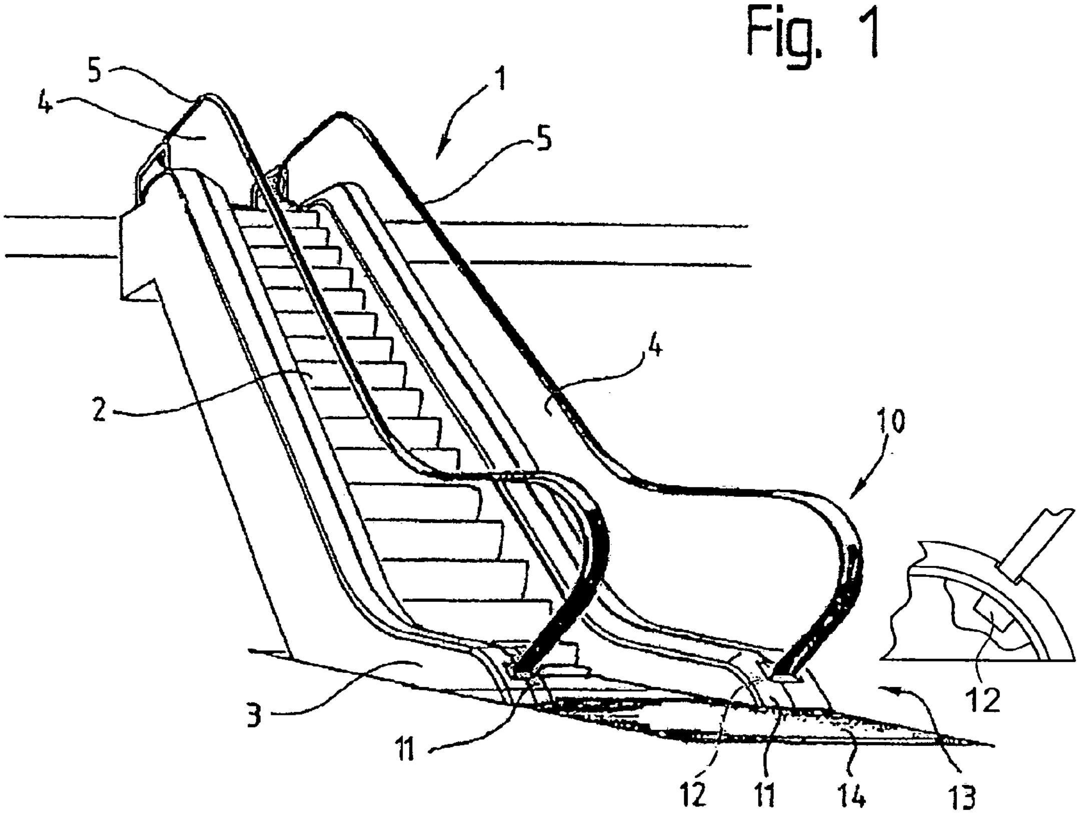
FIG. 1 is a schematic illustration of an escalator together with a detail enlargement of a portion of the balustrade thereof.

FIG. 1 shows a schematic illustration of an escalator 1. The escalator 1 comprises a number of steps 2 which are embedded as an endlessly circulating step belt between two balustrade pedestals 3. A balustrade 4, on which an endless handrail 5 runs synchronously with the step belt, is installed on each balustrade pedestal 3. The handrail 5 is continuously led into the balustrade pedestal 3 in the lower region of a handrail deflection region 10. In this lower region, the balustrade pedestal 3 is provided with handrail inlet caps 11. Sensors 12 are arranged at the handrail inlet caps 11. The sensors 12 monitor the access to the escalator 1 in a specific region 13 in front of the entry to the escalator 1, for example in the region of an entrance plate 14. The sensors are sensitive to electromagnetic waves with a wavelength larger than 100 micrometers, i.e. outside the visible and infrared range. It is to be appreciated that in the case of a moving walkway, the steps 2 are replaced with a walk; the term “escalator” as used herein is intended to also embrace such moving walkways.i)

The best results were achieved with a wavelength of 12.5 millimeters, which corresponds to a frequency of 24 Gigahertz. However, the entire wavelength range between 1 millimeter and 100 millimeters is suitable for this application. In the detail, a part of the lateral pedestal facing is broken away. The sensor 12 mounted within the pedestal and not visible from the outside, is depicted above the break line.

Figure 2:
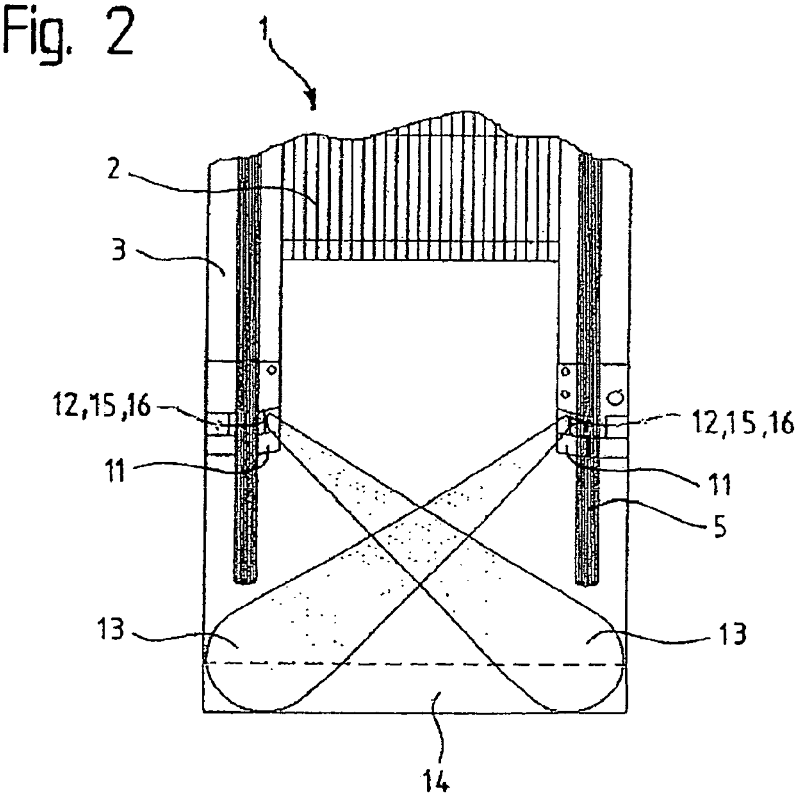
FIG. 2 is a detail of a plan view of an escalator in the region of the escalator entrance plate.

FIG. 2 shows a detail plan view of the escalator 1 in the region of the entrance plate 14. The sensors 12 are integrated in the handrail inlet caps 11 to be invisible. Each includes a transmitter 15 and a receiver 16, preferably including a planar antenna. Transmitter 15 and receiver 16 operate on, for example, a high-frequency basis, i.e. with wavelengths shorter than 1 meter, and respond to reflections or return of the high-frequency waves by persons and objects. The sensors can be radar sensors. When the monitoring region 13 of a sensor 12 is entered, the waves or high-frequency signals emitted by the transmitter 15 are reflected or returned by the person or the object and picked up by the associated receiver 16. This response of the sensor 12 triggers a signal which is processed electronically, and which is not further described here, and leads to the starting of the drive of the escalator 1. If the sensors 12 should fail, then the escalator 1 remains in constant operation.

In an alternative embodiment the sensor 12 can be mounted on only one side in a handrail inlet cap 11. The transmitter 15 and receiver 16 in this case have to be so oriented and dimensioned so that the monitoring region 13 remains insured as in the above-described example.

Figure 3:
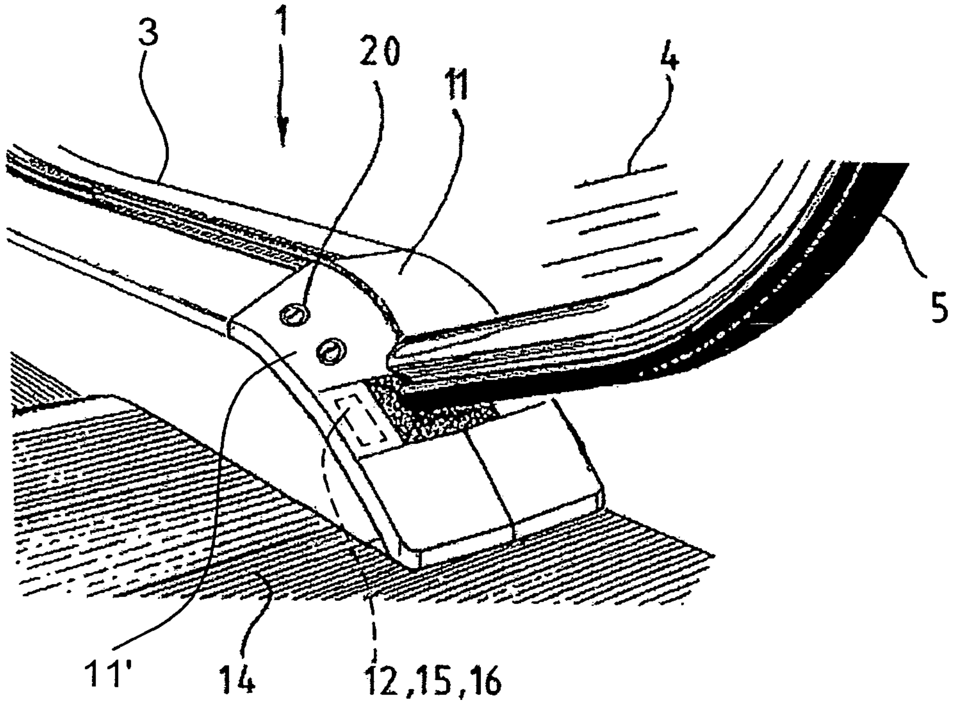
FIG. 3 is a detailed view of a portion of an escalator incorporating a first embodiment of the invention.

FIG. 3 presents a detailed view of a chamfered handrail inlet cap 11 with an installed sensor 12. The handrail inlet cap 11, serving as a connection with the pedestal, is inclined not only towards the pedestal end, but also towards the step belt. Thus a surface 11' facing the user of the escalator results. The sensor 12 is mounted within the handrail inlet cap 11. Transmitter 15 and receiver 16 are so integrated in the handrail inlet cap 11 that they remain completely concealed from and invisible to the user. This has the advantage that damage to the sensor 12 through vandalism or by intention can be virtually excluded. Moreover, through mounting of the sensor 12 on the rear or inner side of the handrail inlet cap 11 production is simplified. Fitting into mounting openings of the pedestal is not required. In addition, further control elements, such as, for example, an emergency switch 20, can be arranged in the robust handrail inlet cap 11. Further, through this arrangement of the sensors 12 the installation and materials cost is kept very small, since no additional leads, which go from the actual escalator 1 or from the balustrade pedestal 3, have to be laid or wired during assembly.

Figure 4:
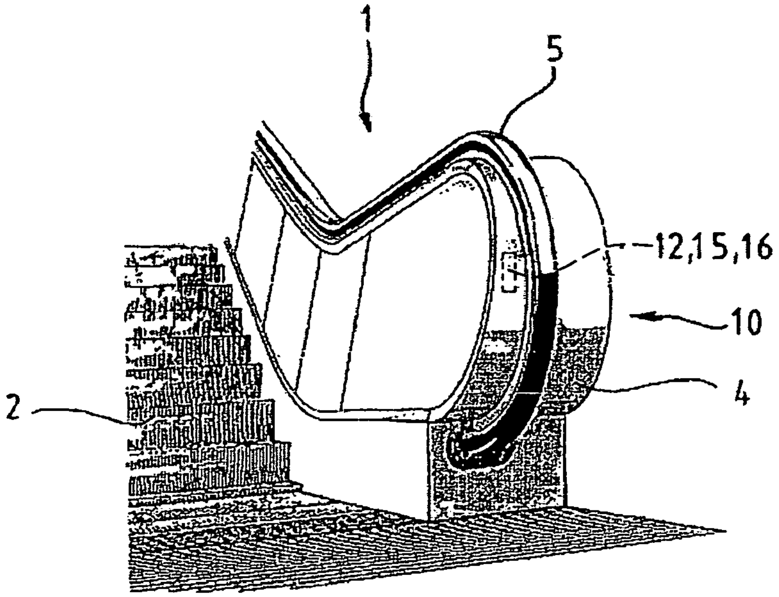
FIG. 4 is a detailed view of a portion of an escalator incorporating a second embodiment of the invention.

FIG. 4 shows a second embodiment of the invention to monitor the space in front of an escalator 1 or a moving walkway. In this case the sensors 12 with transmitters 15 and receivers 16 are arranged, preferably covered, in the balustrade 4 at the right or the left of the handrail 5 in the region of the handrail deflection 10. The mode of function is the same as in the case of the above-described embodiment.

The monitoring equipment is not visible to the users, since no holes are visible in the plastics material cap. The entire escalator is thereby much more secure against vandalism. No openings can, for example, be glued up with chewing-gum. The new installation part of the monitoring equipment is usable only with synthetic material caps, whereby sufficient permeability for electromagnetic waves is provided in the above-indicated wavelength range. The electromagnetic waves would be disturbed, deflected or intercepted by metallic parts. Thus, in the case of sheet steel or stainless steel front plates this monitoring equipment does not function, since the electromagnetic waves do not penetrate the metal.

Moreover, the monitoring equipment cannot be inadvertently actuated or misaligned by weather influences, since it is hidden behind the protective synthetic material cap. This is to be contrasted to conventional frontal area monitoring which can be triggered in the case of direct sunlight radiation and thereupon starts the escalator.

In addition, the escalator control printed circuit for the present invention is smaller than that required for conventional sensors, and thereby less expensive, since no electronic evaluating system and no amplifier are needed.

However, an electronic evaluating system is advantageously provided which is integrated in small monitoring apparatus (3-pole cable) and which enables directional recognition of the movement of an object by the Doppler effect.

The present invention offers the advantage of recognizing only persons or objects that go onto the escalator and not those who leave the escalator or only brush or cross over the radar wave cone. That is a significant advantage, particularly in the case of parallel arrangement of escalators. With conventional sensor systems, it often happens that departing persons on one escalator erroneously cause the other escalator to start up.

We claim:

1. Equipment for monitoring the space in front of an escalator for the control of drives, wherein the drive is switched on before entry onto the escalator, comprising at least one sensor sensitive to electromagnetic waves with a wavelength longer than 100 micrometers mounted within a pedestal of the escalator in a region of handrail deflection, the sensor being further adapted and arranged to monitor an entry region of the escalator.

2. The equipment according to claim 1, wherein the entry region monitored is an entrance plate of the escalator.

3. The equipment according to claim 1, characterized in that the sensor is completely covered within the pedestal.

4. The equipment according to claim 1, characterized in that the sensor is invisible to users of the escalator.

5. The equipment according to claim 1, 2, 3 or 4, characterized in that the sensor is constructed as a high-frequency sensor and responds to reflections of high-frequency waves or high-frequency signals.

6. The equipment according to claim 5, characterized in that the sensor is sensitive to electromagnetic waves with a wavelength between 1 and 100 millimeters.

7. The equipment according to claim 1, 2, 3 or 4, characterized in that the sensor consists of a transmitter and a receiver.

8. The equipment according to claim 5, characterized in that the sensor consists of a transmitter and a receiver.

9. The equipment according to claim 5, characterized in that the sensor contains a planar antenna.

10. The equipment according to claim 5, characterized in that a sensor is mounted on first and second sides of the escalator.

11. The equipment according to claim 5, characterized in that the sensor is mounted in one of the group consisting of a handrail inlet cap at the end of a balustrade pedestal and a balustrade region of handrail deflection offset from the handrail.

12. The equipment according to claim 5, characterized in that the sensor is a sensor capable of issuing a signal that can be evaluated by the Doppler effect.

13. The equipment according to claim 5 further comprising an electronic evaluating system coupled to the sensors which enables recognition whether a person or object enters onto the escalator or leaves the escalator.

* * * * *